Patented Jan. 10, 1939

2,143,475

UNITED STATES PATENT OFFICE 2,143,475

THERAPEUTIC AGENT

Clyde H. Chase, Detroit, Mich., assignor of one-half to Arthur David, Detroit, Mich.

No Drawing. Application March 17, 1937, Serial No. 131,462. In Canada March 2, 1937

7 Claims. (Cl. 167—74)

My novel product is a protein substance most richly derived from the aortas of animals and more particularly from certain portions thereof to the exclusion of others. It has a wide range of usefulness in therapeutic uses, more particularly in the treatment of body surfaces affected by light, heat and allergic disturbances. As a substance of intravenous injection it should have excellent properties in reducing the effects of shock following burns and light exposure, as indicated by tests on animals wherein toxic effects of sera were counteracted upon injections of the new substance. For treatment of certain mucous membranes affected allergically, there are indications of high value. It has special activity as a vasoconstrictor.

This application is a continuation in part of my former application, Serial No. 103,411, filed September 30, 1936.

In a preferred mode of preparation the aortas of animals, for example beef cattle, are stripped of the outer fatty layer leaving the thin endothelial layer and connective muscular and endothelial tissue, which is rich in the new composition.

The active protein substance of my novel product is not one which I am able to describe exactly by all of its chemical properties, but the following data which has resulted from protracted experiment, taken together with the properties of therapeutic nature which I have discovered will sufficiently isolate the substance from other protein substances. Irrespective of the data given below, it should be understood that all physiological salt solutions of the source material hereinafter identified will contain the substance discovered by me.

By treating the tissue with water, some of the new composition is extracted in the solution, but it is particularly soluble in certain salt solutions. Thus by treatment of the selected portion with a neutral sodium chloride solution so that the salt content of the extract obtained is between 4 and 6% a maximum extraction of the substance in question is obtained. From this solution, when brought to a hydrogen ion concentration about 4, the active substance is precipitated. On adding to the precipitate, suspended, in water, sufficient alkali to bring the hydrogen ion concentration to seven or above the substance redissolves. From a substantially neutral solution of the redissolved substance some of the active material is precipitated when sufficient sodium chloride is added to bring its concentration up to 15–17%. On saturating the solution with sodium chloride, substantially all of the active substance is precipitated.

Certain other solutions will dissolve and hence extract the active substance from aortic tissue. For example 1% sodium carbonate solution, and .1% sodium hydroxide solution. Using neutral potassium phosphate solution it was found that maximum extraction was obtained at around 6% concentration.

My usual procedure is to extract the aortic tissue with sodium chloride solution of around 6%, although I have used as low as .85% solution with advantageous results in appearance of the final product. The solution is then treated to precipitate out the active substance. This may be done by making the same acid with hydrochloric acid. I find by adding sufficient hydrochloric acid to the extract to bring the pH to about 4, that a substantially complete precipitation appears to occur. If the acid content is increased to bring it above 5 molar, the precipitate is completely redissolved.

Other substances will precipitate the active product and it responds to tests indicating that it is predominantly a protein. Also fractionating indicates that the substance obtained by acid precipitation consists predominantly of globulins, the remainder being albumins.

The precipitate which is obtained by acidifying the extract may be redissolved by means of dilute alkali, and remains in solution on making the solution neutral, and in this form can be administered therapeutically.

Referring to the globulin element of the active substance, I have further purified it after first precipitating from the saline extract by means of acid. This redissolved precipitate was separated into a globulin and albumin fraction by precipitation with ammonium sulfate in the manner generally known to the art. The globulin portion after a second reprecipitation with ammonium sulfate was dialyzed for 72 hours to remove ammonium salts, after which it redissolved in dilute neutral saline solution. On adding an equal volume of saturated sodium chloride solution to the redissolved material in neutral solution a precipitation of part of the protein occurs. The complete saturation of the filtrate, after removal of the first precipitate resulted in a second precipitation of protein. The first precipitate obtained by this procedure redissolves with some difficulty in water, but redissolves readily in dilute sodium hydroxide solution after removing most of the salt by dialysis. The second precipitate redissolves readily in water.

Addition of a dilute solution of calcium chloride caused the first fraction to reprecipitate, but did not precipitate the second.

Neither protein had any noted effect on blood coagulation, and both were precipitated from 0.75 molar sodium sulfate solution.

Neither of the protein fractions coagulated in neutral or slightly alkalin solutions upon heating to temperatures as high as 80° C.

There does not seem to be much difference between the two globulin fractions except as noted, and they may be the same.

My usual composition consists of the protein material obtained by acid precipitation whether dry; in solution, or in the form of a paste. The drying can be carried out by evaporation, following precipitation with acid. Ordinarily it will be the solutions which are employed.

The protein obtained by reprecipitation with salts, as described above is the purest state in which I have obtained my substance, but it will ordinarily be unnecessary for practical purposes to carry the isolation that far.

The novel protein applied in solution or in the form of a paste will form an eschar on burned surfaces of the body which is translucent, and will come off readily when new skin is formed beneath it. It will relieve pain from the burn almost instantly, and when intravenously injected should prevent shock arising from a burn. Also the protein has certain vasoconstrictor properties, of a different nature from ordinary vasoconstrictors but serving to promote tone in the blood vessels. It has no blood coagulent properties such as a protein extracted from lung tissue will have, when obtained in somewhat the same manner. When applied to old ulcers or slow healing sore, it not only promotes vascular tone but forms a protective covering which is translucent to healing ultra violet rays.

I am aware that others have endeavored to produce substances from the aortas of animals, but so far as I understand their work they have not produced the substance of my invention, since in one way or another they have retained and used the portions of the aorta which are rejected by me, and rejected or chemically changed the portion which is used by me.

As a typical example of a production of my new composition, I may proceed as follows:

Fifty aortas of beef cattle, weighing approximately twelve pounds will be stripped as above noted to remove the outer fatty layer. Any adhering blood is wiped off. Approximately five pounds of tissue will be obtained which is chopped up and placed in salt solution containing 0.85% sodium chloride, using 600 c. c. per pound of tissue extracted. The mixture is allowed to stand, either at room temperature or in the ice box, with intermittent maceration for 18 to 20 hours. A small amount of chloroform is added as a preservative. The extract is then squeezed off, yielding about 3000 c. c. of a pink solution. Any tissue particles are removed by filtration, and to the extract is then added one sixth its volume of tenth normal hydrochloric acid, which brings the extract to a pH about 4.2 and precipitates out the desired material. The precipitate is then filtered off, but should be allowed to remain slightly moist. It is then suspended in 100 to 200 c. c. of distilled water. Sufficient third normal sodium hydroxide is then added to just redissolve the precipitate, about 100 c. c. being required to redissolve the precipitate obtained from 3000 c. c. of extract. This protein solution is slightly alkalin, and is quite clear. It is then adjusted to a pH of 7.0 by the addition of the necessary amount of tenth normal hydrochloric acid. The neutral solution is light brown in color. To this solution is added sufficient sodium chloride to make the concentration about 0.9%, and a preservative such as phenol and/or merthiolate in quantities sufficient to maintain it sterile. Sufficient physiological saline containing preservatives is generally added to give a solution whose protein content is about 1%. From five and one half pounds of tissue extracted will be obtained about 2000 c. c. of protein solution of the desired strength.

It should be noted particularly that the protein forming my new therapeutic agent, is only a fraction of the protein content of the aorta portions which are employed. The best tests for identification of this protein element of the body are the tests of its functions, but it can be described with relation to the source from which it is preferably obtained. Apparently vascular tissue such as the vena cava or large vein leading to the heart has considerable amounts of the substance, and other vascular tissue has it so that as a generalization not founded on complete investigation of vascular tissue throughout the body, it is indicated that vascular tissue in general has the protein material in some proportion. I have not found any part of the body which approaches the inner part of the aorta in richness of content.

I find that animal extract or juice from arterial tissue either as prepared and purified as above, or otherwise, has when applied externally to burns, the properties of relieving the pain, of promoting granulation, of preventing scars, of developing normal skin growth, of preventing or minimizing loss of sera, of retarding or stopping bacterial invasion, and of promoting vascular tone; thus minimizing necrosis. The term burn is to embrace all degrees of burns known as first, second and third degrees of whatever source. Also, it includes frostbite.

Referring to the intravenous injection of my purified substance I find that it lessens shock resulting from thermal or light effects, this shock being a serious accompanying symptom in severe burns, for example.

As compared to tannic acid, gentian violet and other tanning substances my material forms an eschar which is semi-permeable to light for several days even on deeper burns which promotes healing; my material relieves pain much more rapidly. The eschar is not adherent to the wound or coagulating so as to partially devitalize the covered tissue. The eschar may be removed without resultant hemorrhage or requiring anesthetics. Detection of infection can be made without removal of the eschar also and the eschar not only acts as a bridge or covering for granulating tissue but prevents infection from penetrating to the granulating tissue more effectively than the eschars of tannic acid. The eschar of my material becomes dry, thinner and cracks off or desquimates as the skin cells regenerate beneath it. Normal tissue is not coagulated or destroyed in any way but the eschar retains and protects epithelial islands at the hair follicles. Indeed no caustic or tanning effects are exhibited. Thus in promoting skin growth, relieving pain, protecting against bacterial invasion, the formation of an eschar by the use of my product is of general importance in cases where there is a removal of the outer layer of the skin from the body.

The product as isolated by me can be mixed with other substances which will not chemically affect or coagulate it if it is to be employed in solution or in a paste. It resembles in response to physical and chemical tests other proteins which are said to be obtained from certain tissues as of the lungs and brain in forming blood coagulating promoters, but the substance of my invention has no coagulating qualities.

Since the protein material is novel in the arts, I do not wish to be limited to the animal source from which it is obtained nor the precise method of its isolation.

Having thus described my invention, what I claim as new and desire to secure by Letters Patent is:—

1. A therapeutic agent for use in preparations for external application to burned surfaces, weeping surfaces and those affected by loss of sera consisting of the extract of arterial and venous tissue containing in active proportions the protein element thereof which is soluble in its natural state in dilute salt solutions and largely precipitatable therefrom by making the same acid, said agent having qualities of relieving pain, forming a protective coating over the surfaces which is translucent, and promoting vascular tone.

2. A therapeutic agent for use in preparations for external application to burned surfaces, weeping surfaces and those affected by loss of sera consisting of the extract of the non-fatty elements of the aorta of animals containing the protein element thereof which is soluble in its natural state in dilute salt solutions and largely precipitatable therefrom by making the same acid, said agent having qualities of relieving pain, forming a protective coating over the surfaces which is translucent, and promoting vascular tone.

3. An agent for establishing an eschar over surfaces of the body denuded of the outer skin consisting essentially of a protein derived by extraction from the non-fatty protein elements of the aorta of animals, which protein is precipitatable from solutions thereof by making the same acid, said eschar being translucent and separating as epithelium grows underneath, without tanning effect and causing no destruction of tissue.

4. A therapeutic agent for use in external application to burns, burned surfaces, weeping surfaces and those affected by loss of sera, consisting essentially of a protein derived from animal tissue, said protein being most richly found in the non-fatty portion of the aorta of animals, soluble in its natural state in dilute salt solutions and precipitatable therefrom by making the same acid, which protein forms a translucent eschar and relieves pain.

5. A therapeutic agent comprising a protein substance richly present in the inner, non-fatty layer of the aorta of animals, soluble in its natural state in dilute salt solution and precipitatable therefrom by making the same weakly acid, said agent having among other qualities that of forming a translucent eschar upon affected body surfaces, relieving pain and being a non-coagulant of blood.

6. A therapeutic agent comprising a protein substance richly present in the inner, non-fatty layer of the aorta of animals, soluble in its natural state in dilute salt solution and precipitatable therefrom by making the same weakly acid, said agent having among other qualities that of forming a translucent eschar upon affected body surfaces, relieving pain and being a non-coagulant of blood, said agent being most completely extracted from animal tissue in sodium chloride solution when the extract is of 4–6% NaCl, and one which will not remain in precipitation upon acidulation when the acid is as high as 5 molar.

7. A therapeutic agent comprising a protein substance richly present in the inner, non-fatty layer of the aorta of animals, soluble in its natural state in dilute salt solution and precipitatable therefrom by making the same weakly acid, said agent having among other qualities that of forming a translucent eschar upon affected body surfaces, relieving pain and being a non-coagulant of blood, said agent being most completely extracted from animal tissue in sodium chloride solution when the extract is of 4–6% NaCl, and one which will not remain in precipitation upon acidulation when the acid is as high as 5 molar, and will be in maximum precipitation when this solution is at a pH of about 4, and will not dissolve in a salt solution of 15% and richer.

CLYDE H. CHASE.